US011955853B2

(12) United States Patent
Takada et al.

(10) Patent No.: US 11,955,853 B2
(45) Date of Patent: Apr. 9, 2024

(54) DRIVE MOTOR AND VACUUM CLEANER HAVING THE SAME

(71) Applicant: Samsung Electronics Co., Ltd., Suwon-si (KR)

(72) Inventors: Masayuki Takada, Yokohama (JP); Minoru Yoshida, Yokohama (JP); Takashi Kosaka, Nagoyashi (JP); Yuuki Nakabayashi, Nagoyashi (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 17/449,886

(22) Filed: Oct. 4, 2021

(65) Prior Publication Data

US 2022/0029511 A1    Jan. 27, 2022

Related U.S. Application Data

(63) Continuation of application No. PCT/KR2020/005135, filed on Apr. 17, 2020.

(30) Foreign Application Priority Data

Apr. 18, 2019  (JP) ................................. 2019-079575
Apr. 16, 2020  (KR) ........................ 10-2020-0045896

(51) Int. Cl.
*H02K 19/10*  (2006.01)
*A47L 9/22*  (2006.01)
(Continued)

(52) U.S. Cl.
CPC .............. *H02K 19/103* (2013.01); *A47L 9/22* (2013.01); *H02K 1/02* (2013.01); *H02K 1/146* (2013.01); *H02K 1/246* (2013.01); *H02K 7/14* (2013.01)

(58) Field of Classification Search
CPC ........ H02K 19/103; H02K 1/02; H02K 1/146; H02K 1/246; H02K 7/14; A47L 9/22
(Continued)

(56) References Cited

U.S. PATENT DOCUMENTS 4,698,537 A  *  10/1987  Byrne ................... H02K 19/103
                                                       310/168
5,672,925 A  *   9/1997  Lipo ....................... H02K 19/24
                                                       310/154.11
(Continued)

FOREIGN PATENT DOCUMENTS

CN       108649768 A       10/2018
JP       2001046285   *    2/2001  ............. H02K 21/24
(Continued)

OTHER PUBLICATIONS

Machine translation pf Yamashita et al. WO2007119393, Oct. 2007 (Year: 2007).*
(Continued)

*Primary Examiner* — Terrance L Kenerly

(57) ABSTRACT

A small sized drive motor that achieves both high output including high-speed rotation and weight reduction is realized. Provided is a drive motor rotating in a predetermined direction. The drive motor includes a rotor having no magnet and including a plurality of salient poles. A stator core includes a plurality of element cores and a plurality of magnets. The salient poles are formed with a slit or a void (e.g., a second air gap)). The salient poles include a large magnetic circuit (a first magnetic circuit) on a front side of the slit in the rotational direction and having a large cross-sectional area and a small magnetic circuit a second magnetic circuit) on a rear side of the slit in the rotational direction and having a small cross-sectional area.

6 Claims, 9 Drawing Sheets

(51) Int. Cl.
    *H02K 1/02*   (2006.01)
    *H02K 1/14*   (2006.01)
    *H02K 1/24*   (2006.01)
    *H02K 7/14*   (2006.01)

(58) Field of Classification Search
    USPC .......................................... 310/181, 216.074
    See application file for complete search history.

(56) References Cited

U.S. PATENT DOCUMENTS

| | | |
|---|---|---|
| 7,420,308 B2 | 9/2008 | Ramu et al. |
| 2003/0193256 A1* | 10/2003 | Liebermann ............. H02K 3/24 |
| | | 310/194 |
| 2014/0021809 A1* | 1/2014 | Burress .................. H02K 1/141 |
| | | 310/46 |

FOREIGN PATENT DOCUMENTS

| | | | |
|---|---|---|---|
| JP | 2002199679 A | 7/2002 | |
| JP | 2006149030 A | 6/2006 | |
| JP | 4466491 B2 | 5/2010 | |
| JP | 5791713 B2 | 10/2015 | |
| JP | 2017107889 A | 6/2017 | |
| WO | WO2007119393 * | 10/2007 | ............... H02K 1/27 |
| WO | 2015190678 A1 | 12/2015 | |

OTHER PUBLICATIONS

International Search Report and Written Opinion of the International Searching Authority in connection with International Application No. PCT/KR2020/005135 dated Aug. 18, 2020, 9 pages.

* cited by examiner

DRIVE MOTOR AND VACUUM CLEANER HAVING THE SAME

CROSS-REFERENCE TO RELATED APPLICATIONS

This application is a continuation of International Application No. PCT/KR2020/005135, filed Apr. 17, 2020, which claims priority to Japanese Patent Application No. 2019-079575, filed Apr. 18, 2019, and Korean Patent Application No. 10-2020-0045896, filed Apr. 16, 2020, the disclosures of which are herein incorporated by reference in their entirety.

BACKGROUND

1. Field

The present disclosure relates to a drive motor rotating in a predetermined direction without using a magnet in a rotor and a stick-type vacuum cleaner including the same, and more specifically, to a drive motor suitable for high-speed rotation and a stick-type vacuum cleaner having the same.

2. Description of Related Art

Recently, a so-called stick-type vacuum cleaner, in which a cleaner body, a hose, an electric cord, and the like are omitted, is getting attention. A stick-type vacuum cleaner needs to rotate a small fan at a high speed to generate a high suction force. Accordingly, there is a demand for a drive motor (a mini-fan motor) capable of realizing high-speed rotation of 50000 r/min or more, and even higher-speed rotation of 100000 r/min or more, with a miniaturized size and light weight while securing a certain amount of torque.

In general, a magnet used in a rotor of a motor is destroyed and scattered by a centrifugal force generated during a high-speed rotation due to the low allowable tensile stress, so a structure for protecting the surface of the rotor with a Stainless Use Steel (SUS) pipe, carbon fiber or glass fiber is known. On the other hand, there is also a switched reluctance motor that does not use a magnet for a rotor but only includes an electromagnetic steel sheet having an allowable tensile stress that is much higher than that of the magnet, and the rotor of the switched reluctance motor, composed of only the electromagnetic steel plate with a high allowable tensile stress, forms a strong structure, and thus when compared to a magnet type motor, has a very low risk of damage even when the rotor is rotated at a high speed. Therefore, the switched reluctance motor is suitable for a mini fan motor.

On the other hand, the switched reluctance motor rotates only by an attraction force that attracts an iron rotor to a stator teeth excited by electric current flowing through a coil of the stator. Accordingly, in order to achieve high output, there is a need to increase the number of windings of the coil, expand the cross section of the coil, and increase the use of copper, which has a large specific gravity. Therefore, compared with a magnet-type motor that rotates using magnetic attraction and repulsion, the switched reluctance motor is lacking in terms of motor output, efficiency, and reduction in size and weight.

Accordingly, there is proposed a flux switching motor that includes a stator in which a coil and a magnet are installed, in which the attraction force is strengthen by forces with which a rotor teeth excited by a magnetic flux flowing from the magnet arranged in the stator and a stator teeth excited by the coil attract each other (e.g., Patent Documents 1 and 2).

PATENT DOCUMENT (Patent Document 1): Japanese Patent Laid-Open Publication No. 2002-199679

(Patent Document 2): Japanese Patent Publication No. 5791713

SUMMARY

In general, iron materials are mainly used in motors. Therefore, motors become heavy. As motors are reduced in size, the weight decreases in proportion to the decreasing size, but the above-described mini fan motor or the like requires further weight reduction (ultra-lightweight).

Accordingly, the main object of the disclosed technology is to realize a drive motor capable of achieving both high output including high-speed rotation and weight reduction.

The disclosed technology relates to a drive motor that rotates in a predetermined direction.

The drive motor includes a shaft configured to be rotatable, a rotor integrally provided with the shaft, having no magnet and including a plurality of salient poles protruding in a radial direction, and a stator installed around the rotor with an air gap between the rotor and the stator.

The stator includes a stator core including a back yoke and a plurality of teeth inwardly extending from the back yoke, and a plurality of coils installed around the teeth.

The stator core includes a plurality of element cores and a plurality of magnets.

The salient pole is formed with a void. The salient pole includes a large magnetic circuit (or a first magnetic circuit) that is a part extending in front of the void in the rotational direction and having a large cross-sectional area and a small magnetic circuit (or a second magnetic circuit) that is a part extending behind the void in the rotational direction and having a small cross-sectional area.

That is, the rotor of the driver motor does not include a magnet. Therefore, the rotor of the drive motor is composed only of an electromagnetic steel sheet having a high allowable tensile stress, and has a strong structure, so there is a low risk of damage even when the rotor is rotated at a high speed or at a super high speed.

In addition, the stator core has the plurality of element cores and the plurality of magnets, and corresponds to a so-called flux switching motor. Accordingly, the magnetic flux of the magnet flows from the element core through the air gap to enter a protruding end of the salient pole, and the magnetic flux flows out from a protruding end of another salient pole and passes through the air gap and the element core to return to the other magnet, forming a magnetic circuit. As the salient pole is magnetized with an N pole or an S pole according to the rotation angle of the rotor, the magnetic attraction can be strengthened, so that high-speed rotation can be stably performed with high output.

In addition, the salient pole of the rotor is provided with a void. The rotor, a so-called mass of metal, is heavy. Formation of voids in the plurality of salient poles of the rotor can lead to remarkable reduction of the weight of the rotor, and also the weight of the drive motor.

In addition, the salient pole has a large magnetic circuit having a large cross sectional area at a front side in the rotational direction and a small magnetic circuit having a small cross sectional area at a rear side in the rotational direction.

The rotor is rotated by a magnetic attraction force generated between the teeth and the salient pole. In this case, since a large amount of magnetic flux of the magnet is introduced an area between the teeth and the large magnetic circuit, a great attraction force acts on a forward side of the rotational direction. On the other hand, since a small magnetic circuit located at a rear side of the rotational direction has a small cross-sectional area, only a small amount of magnetic flux flows in and out an area between the teeth and the small magnetic circuit compared to the large magnetic circuit, so that only a small attraction acts on a reverse side of the rotational direction.

Accordingly, the magnet torque generated in a direction opposite to the rotational direction of the rotor can be suppressed. As a result, the motor torque required for the rotational direction of the rotor can be increased, so that a high output can be obtained even with a small sized motor. Accordingly, both weight reduction and high output can be achieved.

In the drive motor, the void is provided as a slit that is open in an axial direction and extends in a radial direction, and the salient pole has a thickness at a front side in the rotational direction larger than that at a rear side in the rotational direction with respect to the slit.

Such a slit can be easily machined. The large magnetic circuit and the small magnetic circuit can be simply and precisely formed.

The drive motor may also include the magnets each of which has a pair of inclined side surfaces that become more distant from each other in a radial outer direction, and each of the side surfaces may be in surface contact with the teeth.

Therefore, the surface area of the magnetic pole becomes larger, so that high magnetic force can be obtained.

The motor may also include the magnets, each of which includes an end surface located at an inner diameter side of the motor, the end surface being closer to an outer diameter side of the motor than a protruding end of the teeth is.

Therefore, the amount of the magnet exposed to the leakage magnetic flux of the teeth is reduced, so that irreversible demagnetization, that is, magnetic force reduction can be suppressed, and the output of the motor can be stabilized. In addition, since the eddy current generated when the leakage magnetic flux passes through the magnet can be reduced in the same way, high efficiency of the motor can be achieved.

The drive motor may also be provided using an anisotropic Sm—Fe—N bond magnet including 40% by volume or more of a resin component for each of the magnets.

The use of 40% by volume or more of a resin component can reduce the weight of the magnet. By employing the Sm—Fe—N bond magnet, which has a smaller specific gravity than that of an Nd—Fe—B bond magnet, the weight can be further reduced. In addition, since the magnetic force can be strengthened by adoption of an anisotropic magnet, significant improvement of the output density of the motor can be realized. In addition, since the eddy current loss generated in the magnet is reduced by employing a magnet containing a large amount of resin component, which is an insulator, high efficiency of the motor can be realized even when the amount of resin is increased.

The drive motor may form a fan motor by further including an impeller mounted on the shaft and a shroud having a suction port in the central portion and disposed to cover the impeller.

In the case of a fan motor, there is a demand for a high-speed rotation in a predetermined direction. The drive motor is very effective in meeting the demand. In the case of an integrated fan motor in which an impeller is mounted on a shaft and a shroud is disposed to cover the impeller, the fan motor may be suitable for use in combination with a small drive motor.

In this case, a mini fan motor may be configured with an outer diameter of 100 mm or less, a height of 50 mm or less, and a suction power of 250 W or more.

Because such a mini fan motor is suitable for a stick-type vacuum cleaner, a vacuum cleaner with an excellent convenience can be realized.

In this case, the coil is formed to have a predetermined inner dimension by an edgewise winding in which a flat wire having a rectangular cross section is bent in a direction of a short side thereof, and each of the teeth has an outer dimension coupled to the inner dimension of the coil so that each of the coils may be mounted on each of the teeth.

Since the process of installing the coil to the stator is simplified, manufacturing may be provided in an ultra-mini size. Moreover, the use of an edge-wise winding causes the lateral area of the flat wire exposed to the leakage magnetic flux in the teeth to be reduced, so that high efficiency by suppressing an eddy current can be achieved.

According to the disclosed technology, a drive motor capable of achieving both high output including high-speed rotation and weight reduction while securing a practical torque can be realized.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an embodiment of the present disclosure will be described in detail with reference to the drawings. The description of the following embodiments is illustrative purpose only, and is not intended to limit the present disclosure, the application, or use thereof.

Figure 2:
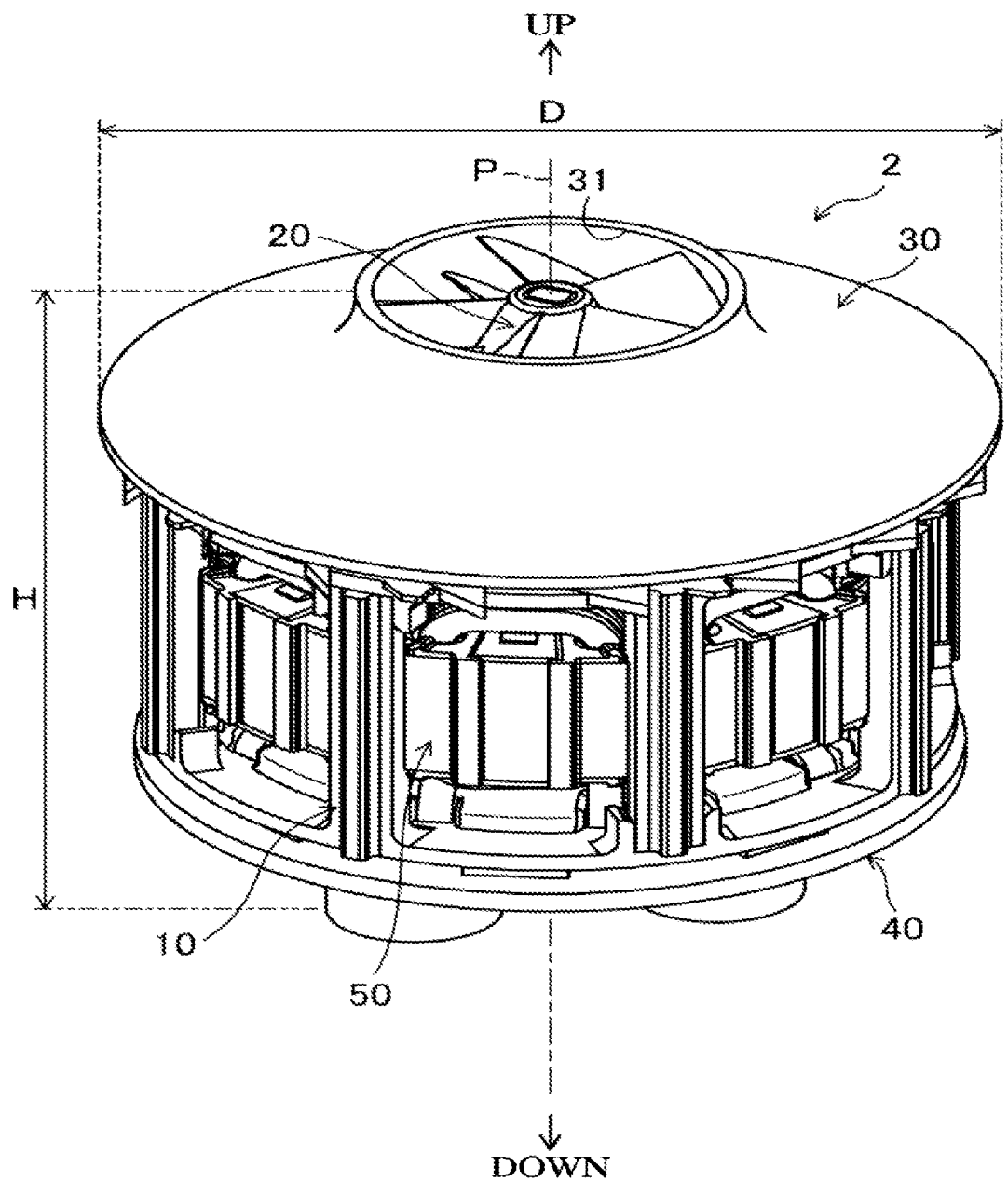
FIG. 2 is a schematic perspective view illustrating a mini fan motor including a drive motor according to an embodiment of the present disclosure.

An upper-lower direction used in the description corresponds to a direction indicated by an arrow in FIG. 2 for the sake of convenience of description. In addition, an axial direction refers to a direction in which a rotation axis P extends, a circumferential direction refers to a direction around the rotation axis P, and a radial direction refers to a direction of a radius or diameter centered on the rotation axis P.

An Application Example of the Disclosed Technology

Figure 1:
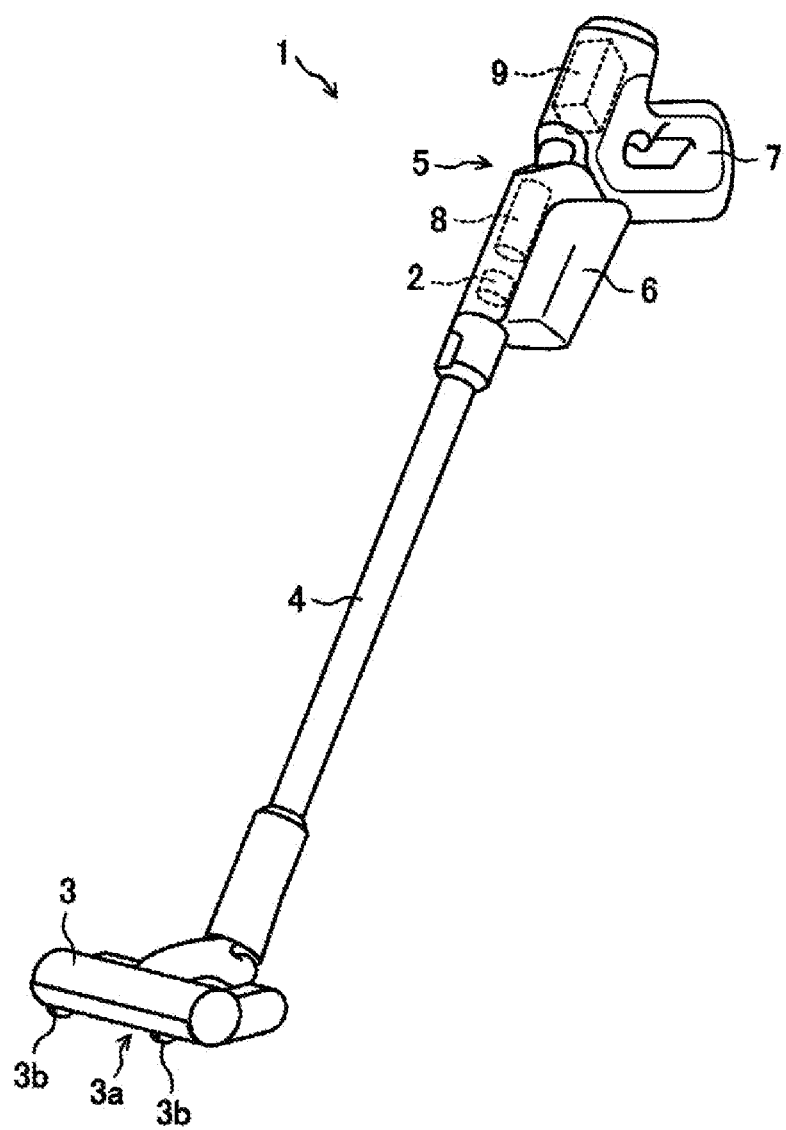
FIG. 1 is a schematic diagram illustrating an application example of a mini fan motor including a drive motor according to an embodiment of the present disclosure.

FIG. 1 is a schematic diagram illustrating an application example of a mini fan motor including a drive motor according to an embodiment.

The vacuum cleaner 1, as a cordless type (wireless) vacuum cleaner, is configured to be driven on the power of a battery 8 installed in the vacuum cleaner 1.

The vacuum cleaner 1 is equipped with a mini fan motor 2 to which the disclosed technology is applied. The vacuum cleaner 1 includes a floor tool 3, a tube 4, a body 5, a dust case 6, a handle 7, etc.

The floor tool 3 is provided on a lower surface thereof with a suction port 3a, and is configured to be slidable along a floor by a rotatable roller 3b. The tube 4 includes an elongated cylindrical member that is extendable and contractible. The tube 4 has a lower end connected to the floor tool 3, and has an upper end connected to the body 5. The tube 4 allows the suction port 3a and the body 5 to communicate with each other.

The body 5 has a size slightly larger than that of the tube 4. The body 5 accommodates a mini fan motor 2, a battery 8, a controller 9, and the like. The controller 9 controls the driving of the mini fan motor 2. The battery 8 is a rechargeable secondary battery and supplies power to the mini fan motor 2.

The handle 7 is a part to be gripped by the user, and is integrally provided with the body 5. The griping part of the handle 7 is provided to protrude rearward from a rear side of the body 5. The vacuum cleaner 1 is configured to be handled while a user grips the gripping part with one hand.

The dust case 6 is provided at a lower side of the gripping part of the handle 7. The dust case 6 is configured to be detachable from the body 5. The mini fan motor 2 is arranged adjacent to the dust case 6. The mini fan motor 2 is driven by the power supplied from the battery 8 under the control of the controller 9. When the mini fan motor 2 is driven, a strong suction force is generated. Accordingly, dust suctioned from the suction port 3a passes through the tube 4 to be finally accumulated in the dust case 6.

<Mini Fan Motor 2>

FIG. 2 illustrates the mini fan motor 2. The mini fan motor 2 is a small device in which a fan and a motor are integrally formed with each other. The fan is a so-called centrifugal fan. As an impeller 20 rotates about a rotation axis P, air is suctioned from the suction port 31 and discharged radially outward.

The mini fan motor 2 is designed to have an outer diameter D and a height H that are significantly small so as to be accommodated in the body 5. Specifically, the outer diameter D is preferably smaller than or equal to 100 mm, and the height H is preferably smaller than or equal to 50 mm. For example, the mini fan motor 2 shown in FIG. 2 may have an outer diameter D of about 70 mm and a height H of about 40 mm (a so-called palm size). Therefore, the mini fan motor 2 is light, and is easily placed on the palm of the hand.

In addition, the mini fan motor 2 is configured to obtain high output with high efficiency so that sufficient performance is obtained as a vacuum cleaner 1 using the electric power of the battery 8. The mini fan motor 2 shown in FIG. 2 is configured to be driven at a high-speed rotation of 50,000 rotations per minute (RPM) or more, and even higher-speed rotation of 100,000 RPM or more, with a power consumption of 600 W, and obtain a suction power greater than or equal to 250 W.

Figure 3:
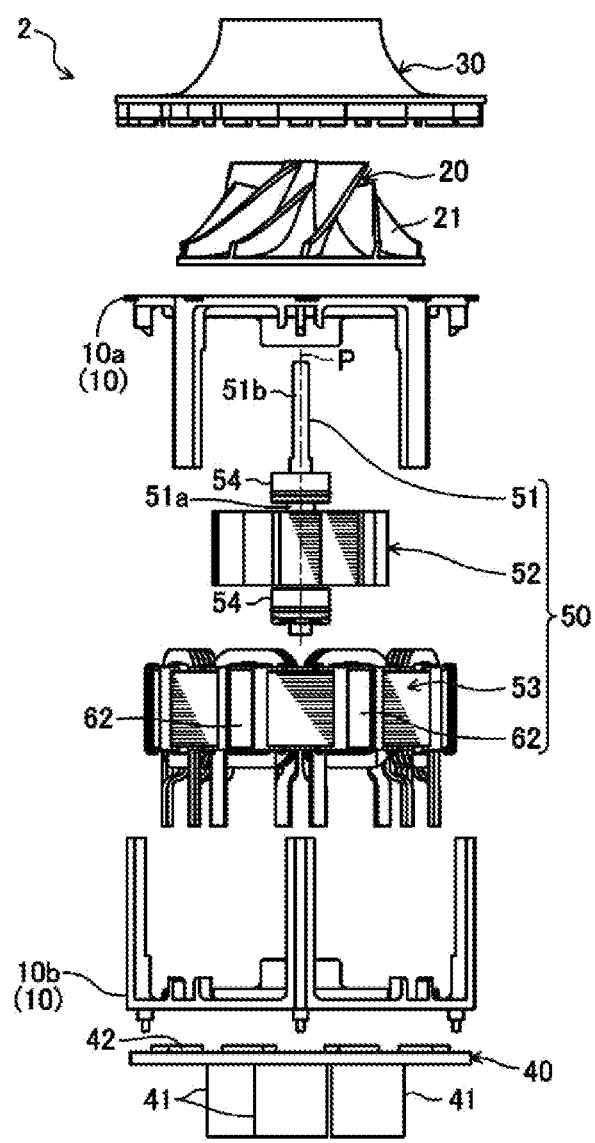
FIG. 3 is an exploded view illustrating a mini fan motor according to an embodiment of the present disclosure.

Referring to the exploded view of FIG. 3 in conjunction with FIG. 2, the mini fan motor 2 includes a housing 10, an impeller 20, a shroud 30, a substrate 40, and a drive motor 50. Here, the disclosed technology is applied to the drive motor 50.

The housing 10 is configured by vertically coupling a first housing 10a and a second housing 10b to each other. The housing 10 has a pair of upper and lower annular frames and a plurality of columnar frames connecting the annular frames to thereby form a basket shape. The drive motor 50 is accommodated in the housing 10.

The impeller 20 has a substantially conical shape and is arranged at an upper side of the housing 10. The impeller 20 includes a plurality of vanes 21 formed on the outer peripheral surface thereof. The impeller 20 is provided at a tip portion of the shaft 51 in a non-rotatable state with respect to the shaft 51.

The shroud 30 is fixed to an upper side of the housing 10 to cover the impeller 20. The shroud 30 is provided with the suction port 31, which is an opening provided in a circle, in the central portion.

The substrate 40 includes a disk-shaped member, and is installed on a lower side of the housing 10. Electrical components, such as a capacitor 41 and a semiconductor element 42, are provided on upper and lower surfaces of the substrate 40.

<Drive Motor 50>

The drive motor 50 has a shaft 51, a rotor 52, and a stator 53.

A magnet 62 is installed on the stator 53 of the drive motor 50, and the rotor 52 is formed of only a magnetic material, so that the magnet 62 is configured to magnetize the rotor 52. The drive motor 50 is a so-called flux switching motor, and is configured to rotate only in one direction (a counter-clockwise direction) using a magnet torque.

<Shaft 51>

Figure 4:
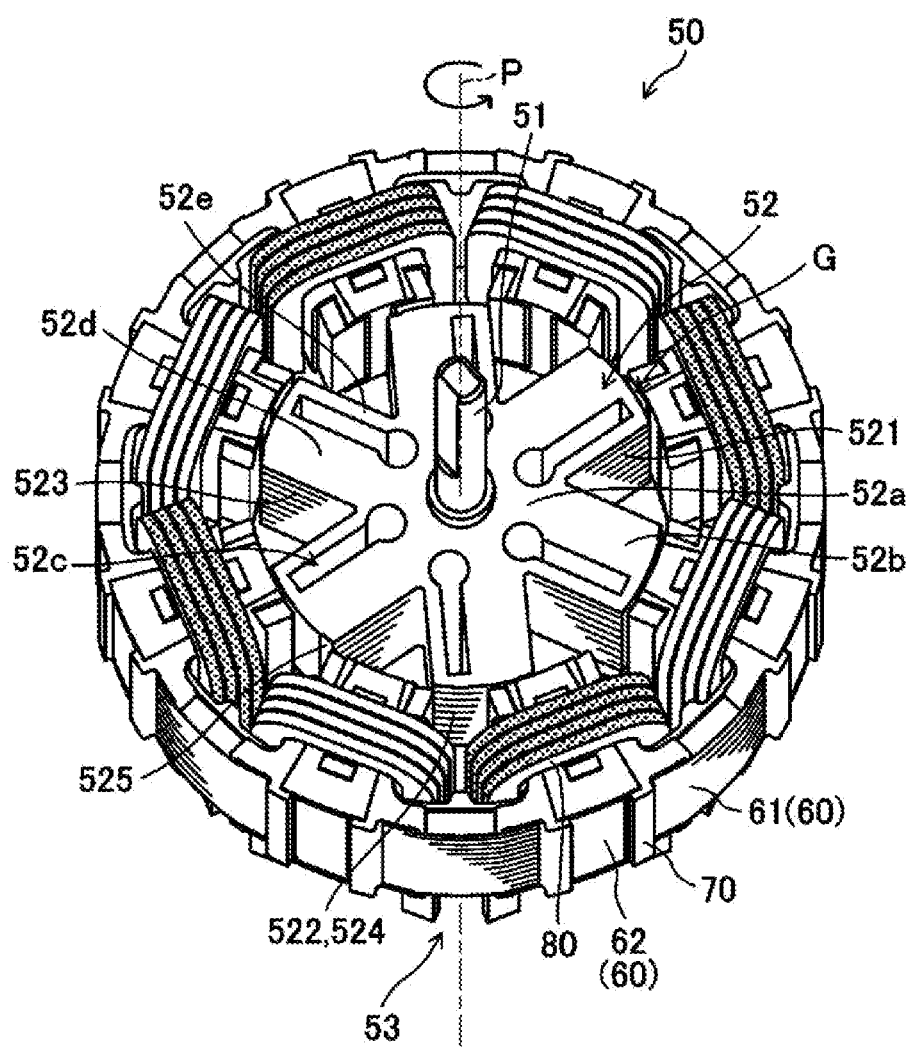
FIG. 4 is a schematic perspective view illustrating a drive motor according to an embodiment of the present disclosure.

Referring to FIG. 4, the shaft 51 includes a cylindrical member. The axial center of the shaft 51 coincides with the rotation axis P. Referring to FIG. 3, the shaft 51 includes a proximal end 51a positioned inside the housing 10 and a distal end 51b protruding upward of the housing 10. A pair of bearings 54 and 54 are mounted on upper and lower portions of the proximal end 51a, and the shaft 51 is axially supported to be rotatable through the bearings 54 and 54 by the housing 10. The rotor 52 is provided integrally with the shaft 51 (or is fixedly coupled to the shaft 51) in the middle of the proximal end 51a.

<Rotor 52>

The rotor 52 includes a boss 52a having a cylindrical shape, and a plurality (six in the embodiment) of salient poles 52b protruding radially from an outer peripheral surface of the boss 52a. The rotor 52 is not provided with a magnet, but is formed only of iron. Specifically, the rotor 52 is formed by vertically stacking a plurality of iron plates (magnetic material) having a substantially star shape as described above.

By press-fitting the proximal end 51a into a shaft hole formed in the center of the boss 52a, the rotor 52 is fixed to the shaft 51. Each of the salient poles 52b protrudes radially outward from the outer peripheral surface of the boss 52a. The salient poles 52b are arranged at regular intervals in the circumferential direction.

Each of the salient poles 52b has a pair of salient pole side surfaces 521 and 523, and a salient pole end surface 522 connected to a salient edge at a radial outer end of the salient pole side surfaces 521 and 523. The pair of salient pole side surfaces 521 and 523 are all formed of a flat surface form and extend substantially parallel to each other while being arranged in a circumferential state. Further, the salient pole end surface 522 includes a salient pole end surface 525 connected to the salient pole side surface 523 and a salient pole end surface 524 connected to the salient pole side surface 521. In addition, a slight curved portion is formed between the salient pole end surface 524 and the salient pole end surface 525, so that in the salient pole end surface 525, an air gap (G, hereinafter, a first air gap) is slightly enlarged. That is, each salient pole 52b has a structure in which the salient pole end surface 525 protrudes forward with respect to the rotational direction (a counter clockwise direction) of the motor 50 (a so-called asymmetric structure). In addition, each of the salient poles 52b is formed with a slit 52c, which will be described below.

<Stator 53>

Referring to FIG. 4, the stator 53 is provided in a substantially circular annular shape using a plurality of members. The stator 53 is installed in the housing 10 with a predetermined air gap (G, hereinafter, referred to as a first air gap) around the rotor 52 therebetween (a so-called inner rotor type). The stator 53 has a stator core 60, an insulator 70, and a coil 80.

Figure 5:
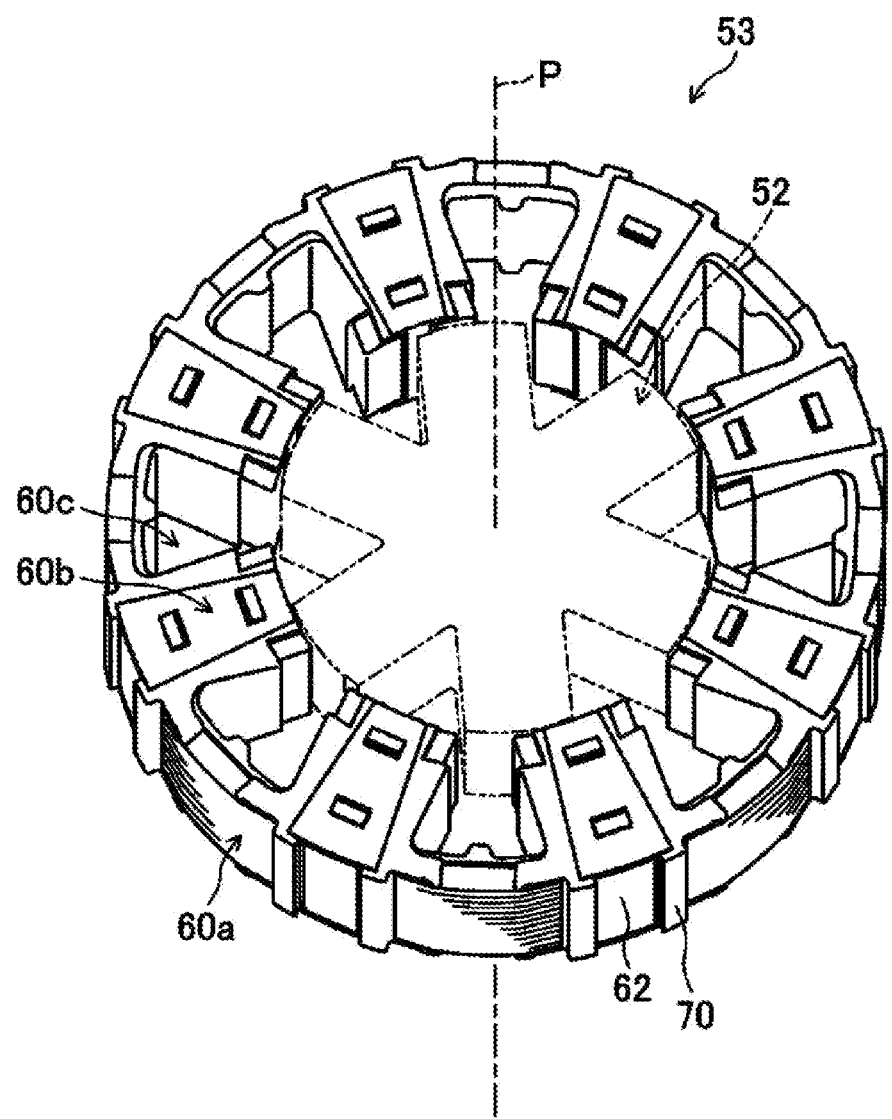
FIG. 5 is a schematic diagram illustrating a stator (not showing coils) according to embodiments of the present disclosure.
Figure 6:
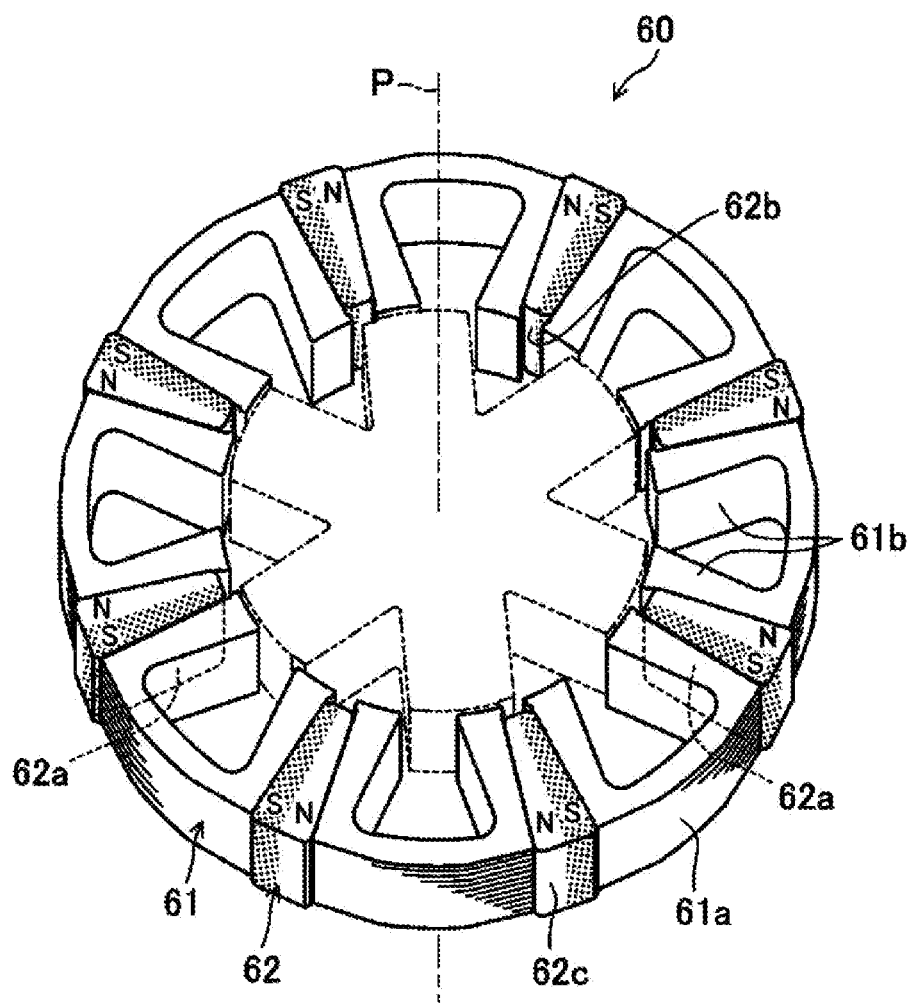
FIG. 6 is a schematic diagram illustrating a stator core according to embodiments of the present disclosure.

FIG. 5 is a schematic diagram illustrating a stator 53 (not showing coils 80). FIG. 6 is a schematic diagram illustrating a stator core 60 (not showing an insulator 70).

The stator 53 (the stator core 60) includes a back yoke 60a in a cylindrical shape and a plurality of (eight in the embodiment) teeth 60b radially extending inwardly from the back yoke 60a. The teeth 60b are arranged at equal intervals in the circumferential direction. A slot 60c for accommodating the coil 80 is formed between two teeth 60b and 60b adjacent to each other among the teeth 60b.

The width (the size in the circumferential direction) of the teeth 60b is formed to be substantially uniform except for a protruding end (the protruding end has a narrow width). The inner diameter of the stator 53 and the outer diameter of the rotor 52 are designed such that an air gap G of a predetermined size is formed between the protruding end of each teeth 60b and the protruding end of the salient pole 52b of the rotor 52.

Referring to FIG. 6, the stator core 60 includes a plurality of (eight in the embodiment) element cores 61 having a substantially U shape when viewed from the above and a plurality of (eight in the embodiment) magnets 62.

Each of the element cores 61 is formed by stacking a plurality of substantially U-shaped iron plates (magnetic bodies) in the vertical direction (the axial direction). Each of the element cores 61 includes an arc-shaped yoke element 61a when viewed from the above, and a pair of teeth elements 61b and 61b extending from both ends of the yoke element 61a in opposite shapes, and each of the element cores 61 is configured to have a constant thickness in the upper-lower direction with respect to the axial direction. The yoke 61a forms a portion of the back yoke 60a, and each of the teeth elements 61b forms a side portion of the teeth 60b.

Each of the magnets 62 is formed in a substantially plate shape using an anisotropic Sm—Fe—N bond magnet containing 40 vol. % or more of a resin component. By employing the Sm—Fe—N bond magnet, which has a specific gravity smaller than that of an Nd—Fe—B bond magnet, the motor 50 may be reduced in weight, and by employing the anisotropic magnet, the magnetic force may be strengthened, so that the output density of the motor 50 is significantly improved. In addition, by 40 vol. % or more of the resin component, which is an insulator, the eddy current generated in the magnet is reduced, so that the motor 50 may achieve high efficiency even when the amount of resin is increased.

Specifically, the magnets 62 has a pair of side surfaces 62a and 62a that are provided in an inclined rectangular shape and become more distant from each other in a radially outward direction, an inner side end surface 62b having a narrow rectangular shape, and an outer side end surface 62c having a wide rectangular shape. One of the side surfaces 62a forms an N pole, and the other one of the side surfaces 62a forms an S pole.

The magnets 62 are radially arranged in the stator core 60 such that the same magnetic poles are opposite to each other in the circumferential direction. Then, in a state in which one magnet 62 is sandwiched between opposing teeth elements 61b and 61b of two element cores 61 and 61 adjacent to each other, the element core 61 and the magnet 62 are connected to each other to form a circular annular shape.

The side surfaces 62a of each magnet 62 make surface contact with the opposing teeth elements 61b and 61b of the two adjacent element cores 61 and 61. The side surface 62a of each magnet 62 is inclined, so that a larger surface area is provided than with a case of having no inclination. Accordingly, a stronger magnetic force is generated, so that the motor 50 may be provided with a high output.

The inner side end surface 62b of each magnet 62 is located on a farther side (an outer side in the radial direction) than the protruding end of each teeth element 61b. When the drive motor 50 rotates, a magnetic circuit (a flow path of a magnetic flux) is formed between the protruding end of the teeth 60b and the protruding end of the salient pole 52b. By further protruding the protruding end of each teeth element 61b into the air gap G than the inner side end surface 62b of the magnet 62 is, the magnetic flux directed toward the magnet 62, that is, the amount by which the magnet 62 is exposed may be suppressed. Accordingly, irreversible demagnetization of the magnet 62 and generation of eddy currents may be suppressed.

Referring to FIG. 5, the stator core 60 connected in a circular annular shape is provided to have the insulator 70 mounted around the stator core 60. Specifically, an upper surface of the teeth 60b, a portion of both side surfaces of the teeth 60b, a portion of the back yoke 60a (a region facing the slot 60c), etc. are covered with the insulator 70. A region of the stator core 60 positioned at the protruding end (a region corresponding to the air gap G) of the teeth 60b is exposed from the insulator 70.

Referring to FIG. 4, a region of each teeth 60b covered with the insulator 70 is provided with the coil 80 installed thereon. Since the drive motor 50 is used for the mini fan motor 2, the size of the drive motor 50 is very small. The coil 80 is also small corresponding to the size of the drive motor 50.

Figure 7:
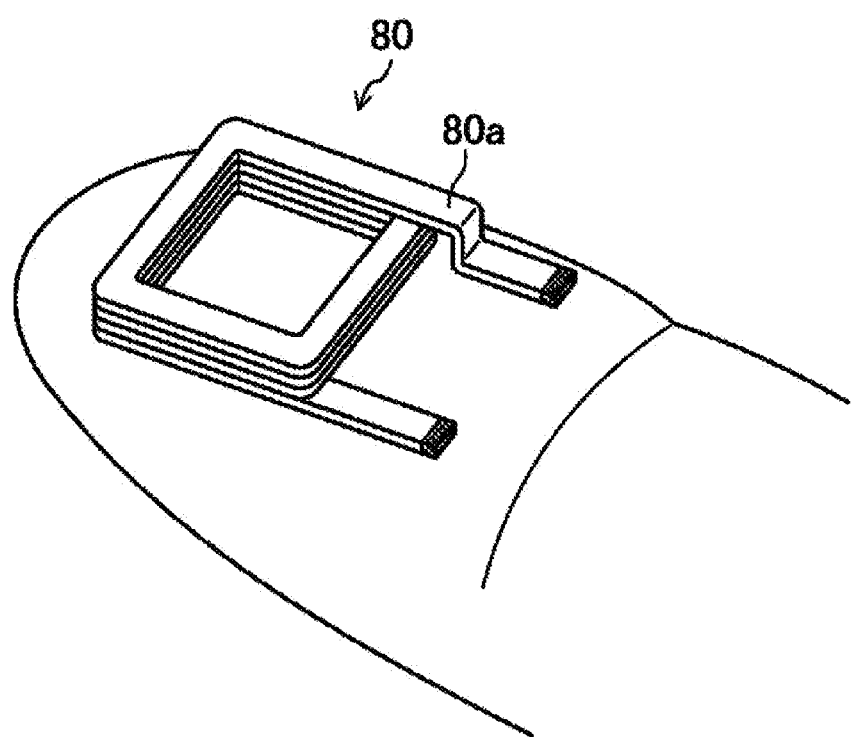
FIG. 7 is a schematic perspective view illustrating a coil according to embodiments of the present disclosure.

FIG. 7 illustrates the coil 80. The coil 80 may generate a high magnetic force and is considered easy to assemble.

That is, each of the coils 80 is formed to have a predetermined inner dimension. In addition, each of the teeth 60b has an outer dimension coupled to the inner dimension of the coil 80, and is configured such that each coil 80 formed in a predetermined shape is mounted to each teeth 60b.

Each coil 80 is formed by winding an electric wire obtained by coating an electric conductor, such as copper, with an insulating film. The electric wire is provided using a flat wire 80a having a rectangular cross section. The coil 80 is formed by bending the flat wire 80a in a direction of a short side of the cross section (an edge-wise winding).

Since the flat wire 80a may be wound without a gap, a higher space factor may be obtained compared to a round wire. In addition, an edge-wise winding allows the wire to be wound along the short sides with a thin thickness, which causes the coil 80 to have a small size in the winding direction (the axial direction), so that the size of the motor 50 may be reduced. In addition, since the lateral area of the flat wire 80a in the circumferential direction is reduced, eddy current generated by an exposure of the flat wire 80a to a fringing magnetic flux leaking from each teeth 60b may be suppressed, and thus the motor 50 may achieve a highly efficiency. Moreover, even when the size in the short side is small, the size in the long side may be increased to enlarge the cross-sectional area of the flat wire 80a i.e., to thereby increase the thickness of the electric wire. Therefore, a large current may flow through the electric wire, so that a high magnetic force may be generated.

A tip end of each coil 80 mounted on each teeth 60b has an insulating film removed therefrom to be connected to a predetermined terminal of the substrate 40. Power is supplied to the substrate 40 from the battery 8. A plurality of switching elements for switching the electric power are provided on the substrate 40, and the controller 9 controls the switching elements so that a predetermined current (alternating current) is supplied to each coil 80.

In the case of the drive motor 50, two different coil groups of two phases of phase A and phase B are configured. As shown in each pattern in FIG. 4, coil groups of phase A and phase B are alternately arranged in the circumferential direction. Two currents (alternating current) of different phases are supplied to the different phase coil groups.

In this case, each salient pole 52b has a structure (an asymmetrical structure) in which the salient pole end surface 525 protrudes with respect to the rotational direction (CCW direction) of the motor 50, so that the drive motor 50, as a two-phase motor, ensures a starting stability while realizing uniform rotational direction in the CCW direction. Here, the salient pole end surface 525 protruding in the rotational direction is not needed in the case of a three-phase motor.

The rotational position of the rotor 52 with respect to the stator 53 is detected from a change in induced voltage, etc., and a control for switching a state of an electric conduction to each coil group is performed based on the rotational position. Thereby, a magnetic field (a rotating magnetic field) for rotating the rotor 52 is formed in the stator 53. By a magnetic attraction force (a magnet torque) between the rotational magnetic field and the salient pole 52b magnetized by each magnet 62, the rotor 52 rotates counterclockwise.

<Detailed Structure of the Rotor 52>

As described above, the salient pole 52b of the rotor 52 has a slit 52c (an example of a void, hereinafter referred to as a second air gap). The slit 52c passes through the salient pole 52b in the axial direction. The slit 52c extends in a radial direction from a boundary with the boss 52a to the protrusion end of the salient pole 52b in a straight line.

The rotor 52 is a so-called mass of iron. Therefore, even though the rotor 52 is heavy, the slit 52c formed in each salient pole 52b may significantly reduce the weight of the rotor 52, and further the weight of the drive motor 50.

In addition, as shown in FIG. 4, each of the salient poles 52b includes a portion (a large magnetic circuit or a first magnetic circuit 52d) located in front of the slit 52c in the rotational direction (a forward side in the rotational direction, the CCW side in the case of the main drive motor 50) and provided to extend in the radial direction with a large width (thickness). In addition, each of the salient poles 52b includes a portion (a small magnetic circuit or a second magnetic circuit 52e) located behind the slit 52c in the rotational direction (a reverse side in the rotational direction, the CW side in the case of the main drive motor 50) and provided to extend in the radial direction with a small width (thickness).

That is, the cross-sectional area (the area of the cross-section with respect to the protruding direction of each of the salient poles 52b) of the large magnetic circuit 52d located on the front side in the rotational direction is larger than that of the small magnetic circuit 52e located on the rear side in the rotational direction. Accordingly, a large amount of magnetic flux of the magnet 62 flows in and out of the large magnetic circuit 52d, and conversely, the amount of magnetic flux that flows in and out of the small circuit 52e decreases. Accordingly, the magnetic attraction force in the rotational direction of the motor 50 increases, and conversely, the magnetic attraction force in the reverse rotational direction of the motor 50 (CW direction in the case of the motor 50) decreases. Accordingly, the motor 50 may achieve a high torque, so that both high output and weight reduction may be achieved.

Figure 8:
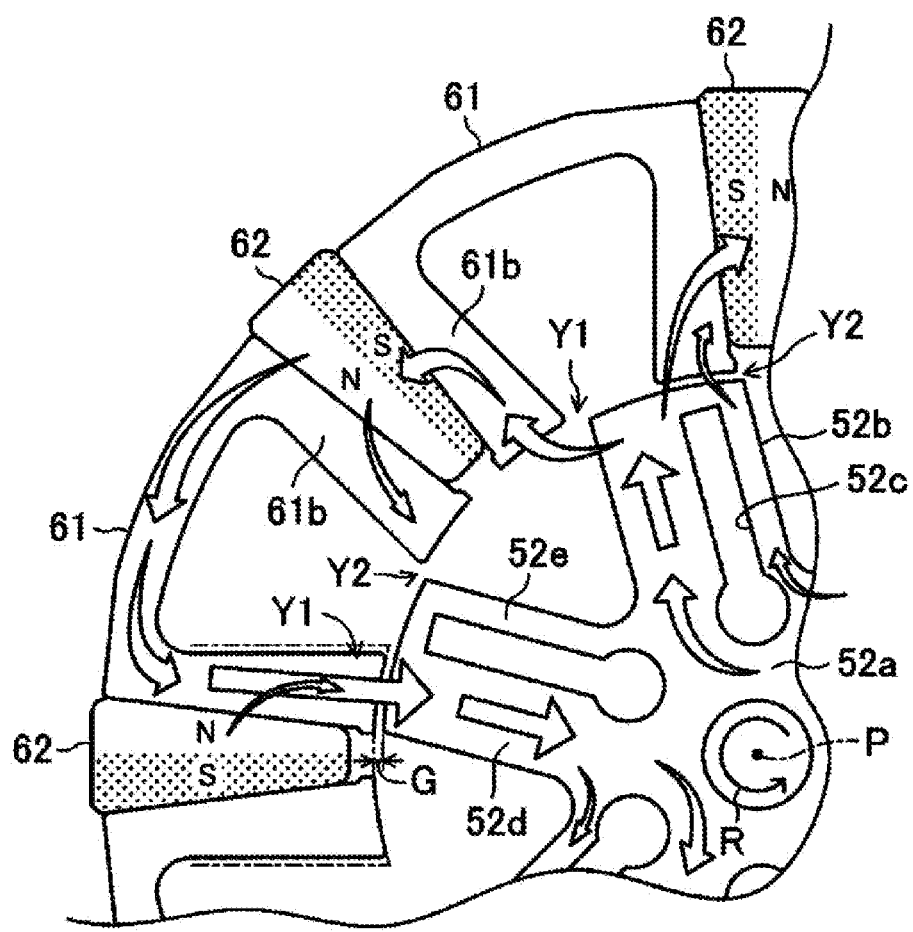
FIG. 8 is a diagram for describing a magnetic state during rotation of a drive motor according to embodiments of the present disclosure.

FIG. 8 is a diagram for describing a magnetic state during rotation of a drive motor 50. The rotor 52 is rotating counterclockwise as indicated by an arrow R.

Since the large magnetic circuit 52d positioned on a front side in the rotational direction has a larger cross-sectional area, a large amount of magnetic flux flows in and out between the teeth 60b (a portion of the teeth element 61b) and the large magnetic circuit 52d as indicated by an arrow Y1, so that a great attraction force acts on a forward side of the rotational direction.

On the other hand, since the small magnetic circuit 52e located on the rear side in the rotational direction has a small cross-sectional area, only a small amount of magnetic flux flows in and out between the teeth 60b (a portion of the teeth element 61b) and the small magnetic circuit 52e compared to the large magnetic circuit as indicated by an arrow Y2, so that only a small attraction force acts on the reverse side of the rotational direction.

Accordingly, a magnet torque generated in a direction opposite to the rotational direction of the rotor 52 may be suppressed. As a result, the torque of the motor 50 may be increased, so that high output may be obtained even with a small size, and both high output and weight reduction may be achieved.

Modified Example

Figure 9:
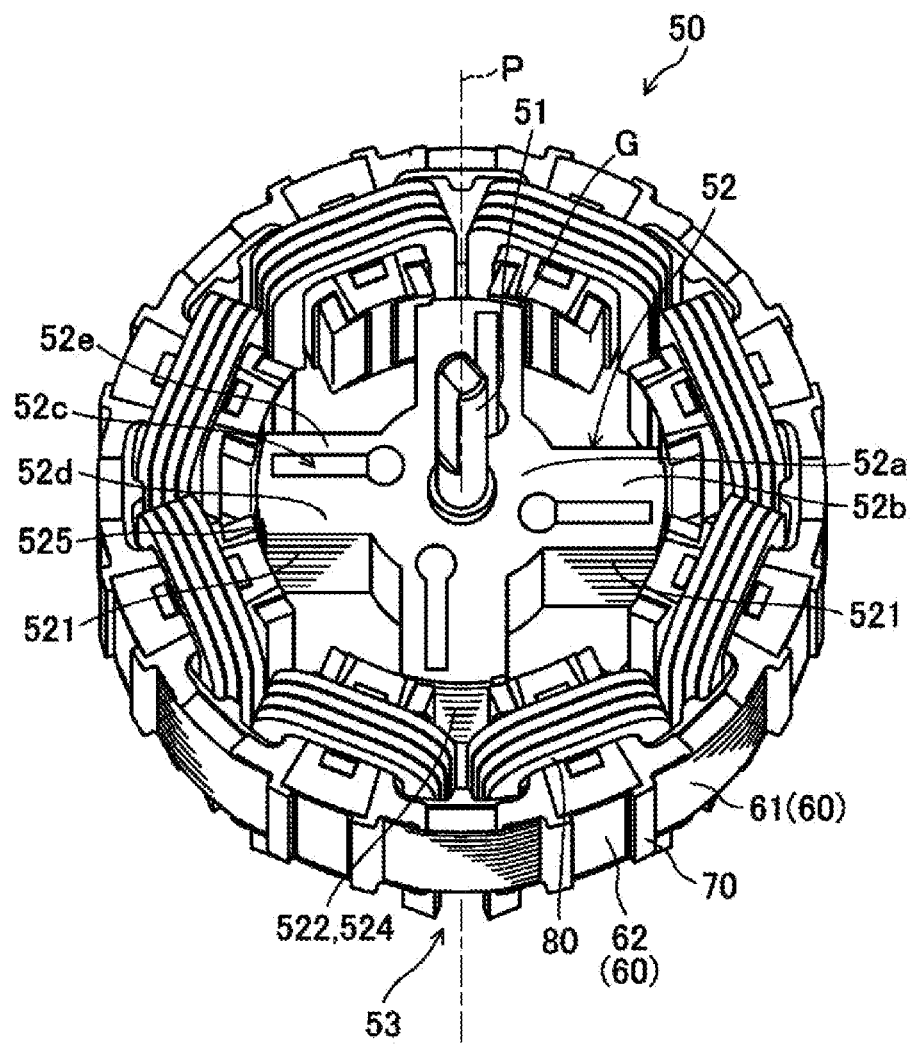
FIG. 9 is a schematic perspective view illustrating a modified example of a drive motor according to embodiments of the present disclosure.

FIG. 9 is a schematic perspective view illustrating a modified example of a drive motor 50. In the drive motor 50 according to the modified example, a rotor 52 having four salient poles 52b is used. Although the drive motor 50 includes eight coils 80, a rotational magnetic field (a so-called single-phase) is formed by switching the energization state of one current (alternating current).

The mini fan motor 2 requires a high-speed rotation of 50,000 RPM or more and even higher-speed rotation of 100,000 RPM or more. As the number of salient poles 52b increases, the energization switching control performed during one rotation increases. Therefore, when the number of rotations is greatly increased, the energization switching control becomes complicated, and there is a concern that the control becomes unstable or uncontrollable. Accordingly, the drive motor 50 according to the present modified example having a small number of salient poles 52b is beneficial in high-speed rotation.

The drive motor according to the disclosed technology is not limited to the above-described embodiment, and includes various other configurations.

For example, although the above-described embodiment exemplifies an application example of a stick-type vacuum cleaner, the disclosed technology is not limited thereto. For example, the disclosure may be applied to an operation of other home appliances, such as a juice blender or a food processor, and a robot.

The shape of the void is not limited to the slit, and the void formed in the salient pole 52b may be provided in various shapes as long as it can form a larger magnetic circuit on a front side in the rotational direction than on a rear side in the rotational direction. For example, the void may be a groove extending in a radial direction, or a space formed inside the salient pole 52b. The void may be divided into a plurality of small voids.

The shape of the slit is also an example. Depending on the specification, the slit may be slightly curved, or become wider or narrower, or may slantingly extend.

The wire of the coil 80 is preferably provided using a flat wire, but is not limited thereto. General round wires may be used.

Further, the motor 50 operates as a so-called two-phase, eight-slot, six-salient pole motor, and in a modified example, operates as a so-called single-phase, eight-slot, four-salient pole motor, but the number of phases, the number of slots, and the number of salient poles are not limited to the above, and may include various combinations of the number of phases, the number of slots, and the number of salient poles, for example, a combination of three-phase, twelve-slot, and ten salient poles.

Although the present disclosure has been described with various embodiments, various changes and modifications may be suggested to one skilled in the art. It is intended that the present disclosure encompass such changes and modifications as fall within the scope of the appended claims.

What is claimed is:

1. A vacuum cleaner comprising a drive motor comprising:
   a shaft configured to be rotatable;
   a rotor rotatably coupled to the shaft and configured to be rotatable about the shaft, the rotor including a plurality of salient poles that protrude in a radial direction from the shaft; and
   a stator positioned to surround the rotor with a first air gap interposed therebetween and arranged along a circumferential direction of the rotor,
   wherein the stator includes:
      a stator core having a back yoke and a plurality of teeth extending inwardly from the back yoke; and
      a plurality of coils respectively installed around the plurality of teeth,
   wherein the stator core includes a plurality of element cores and a plurality of magnets,
   wherein each of the plurality of salient poles includes:
      a second air gap, and first and second magnetic circuit located on opposite sides of the second air gap,
   wherein the first magnetic circuit is located on a forward side of a rotational direction of the rotor among the opposite sides of the second air gap, and
   wherein the first magnetic circuit has a cross sectional area larger than a cross sectional area of the second magnetic circuit for a cross-section perpendicular to a protruding direction of each of the salient poles,
   wherein each of the plurality of element cores is formed by stacking a plurality of U-shaped iron plates formed of magnetic material and including a yoke element in an arc shape and a pair of teeth elements axially extending from both ends of the yoke element in opposing shapes, and
   the yoke element forms a portion of the back yoke, and each of the pair of teeth elements forms a side portion of each of the plurality of teeth,
   wherein the plurality of magnets are arranged with same magnetic poles opposite to each other in the circumferential direction, and each of the plurality of magnets is arranged between opposing teeth elements of two element cores adjacent to each other among the elements cores, and
   the plurality of element cores and the plurality of magnets are arranged in the circumferential direction to form a circular annular shape, and
   wherein each of the plurality of magnets has a pair of inclined side surfaces that are more distant from each other in a radially outward direction, and
   each of the pair of inclined side surfaces makes surface contact with a corresponding one of the plurality of teeth.

2. The vacuum cleaner of claim 1, wherein the second air gap is provided as a slit that is open in an axial direction and extends radially from the shaft, and each of the salient poles has a thickness at a front side of the slit in the rotational direction to be greater than a thickness at a rear side of the slit in the rotational direction.

3. The vacuum cleaner of claim 1, wherein each of the salient poles includes a portion in front of the second air gap along the rotational direction and a portion behind the second air gap along the rotational direction, the portion in front of the second air gap radially protruding toward the first air gap further than the portion behind the second air gap.

4. The vacuum cleaner of claim 1, wherein a radial inner side end portion of each of the pair of teeth elements is closer to the shaft by protruding toward the first air gap further than a radial inner side end portion of each of the plurality of magnets.

5. The vacuum cleaner of claim 1, wherein the plurality of coils are arranged such that two currents having different phases are supplied to coils adjacent to each other among the plurality of coils.

6. The vacuum cleaner of claim 1, wherein each of the plurality of magnets is formed of an anisotropic Sm—Fe—N bond magnet including 40 vol. % or more of a resin component.

* * * * *